(12) United States Patent
Picard

(10) Patent No.: US 9,449,406 B2
(45) Date of Patent: Sep. 20, 2016

(54) MANIPULATING TIMELINES

(71) Applicant: HEWLETT-PACKARD DEVELOPMENT COMPANY, L.P., Houston, TX (US)

(72) Inventor: Jean-Charles Picard, Villeneuve Loubet (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 366 days.

(21) Appl. No.: 13/680,383

(22) Filed: Nov. 19, 2012

(65) Prior Publication Data
US 2014/0143724 A1 May 22, 2014

(51) Int. Cl.
*G06T 11/20* (2006.01)
*G06F 3/0484* (2013.01)

(52) U.S. Cl.
CPC ......... *G06T 11/206* (2013.01); *G06F 3/04847* (2013.01)

(58) Field of Classification Search
CPC .............. G06F 3/0481; G06F 17/246; G06F 3/04847; G06F 3/04855; G06F 3/0484; G06F 3/0485; G06F 17/30064; G06F 17/30846
See application file for complete search history.

(56) References Cited

U.S. PATENT DOCUMENTS

| | | | | |
|---|---|---|---|---|
| 5,771,032 A * | 6/1998 | Cline | ................... | G06F 3/0485 345/622 |
| 5,786,814 A * | 7/1998 | Moran et al. | ................. | 715/720 |
| 6,252,594 B1 * | 6/2001 | Xia et al. | ...................... | 715/786 |
| 6,262,736 B1 * | 7/2001 | Nelson | .......................... | 715/854 |
| 6,278,450 B1 * | 8/2001 | Arcuri et al. | ................. | 715/763 |
| 6,332,147 B1 * | 12/2001 | Moran et al. | ................. | 715/203 |
| 6,380,947 B1 * | 4/2002 | Stead | ............................ | 345/645 |
| 6,931,594 B1 * | 8/2005 | Jun | ...................... | G11B 27/034 715/719 |
| 7,966,570 B2 * | 6/2011 | Doyle | ................... | G06F 3/0481 345/660 |
| 8,232,997 B2 | 7/2012 | Schorr et al. | | |
| 8,566,359 B1 * | 10/2013 | Donohoe | .................. | G06F 3/00 707/793 |
| 2006/0005145 A1 * | 1/2006 | Weinlander et al. | ......... | 715/786 |
| 2006/0107196 A1 * | 5/2006 | Thanu | .................. | G06F 17/246 715/217 |
| 2006/0174189 A1 * | 8/2006 | Weitzman et al. | ........... | 715/503 |
| 2007/0033518 A1 * | 2/2007 | Kenna et al. | ................. | 715/503 |
| 2007/0168875 A1 * | 7/2007 | Kowitz | ................. | G06F 3/0481 715/764 |
| 2008/0270886 A1 * | 10/2008 | Gossweiler | ........... | G06F 3/0483 715/227 |
| 2008/0295016 A1 * | 11/2008 | Audet | .......................... | 715/772 |
| 2009/0055763 A1 * | 2/2009 | Audet | .......................... | 715/764 |
| 2009/0144607 A1 * | 6/2009 | Chen | .............................. | 715/227 |
| 2010/0281383 A1 * | 11/2010 | Meaney et al. | ................ | 715/723 |
| 2010/0306171 A1 * | 12/2010 | Antos et al. | .................. | 707/638 |
| 2011/0113348 A1 | 5/2011 | Twiss et al. | | |
| 2011/0239149 A1 * | 9/2011 | Lazo | ..................... | G06F 3/0482 715/772 |
| 2012/0019553 A1 * | 1/2012 | Noetzelmann et al. | ...... | 345/619 |
| 2012/0130741 A1 | 5/2012 | Sparandara et al. | | |
| 2012/0210231 A1 * | 8/2012 | Ubillos et al. | ................ | 715/723 |

(Continued)

OTHER PUBLICATIONS

Grote, Marc. Configuring Outlook 2007 with Exchange Server 2007. MSExchange.org. Aug. 28, 2007. [online], [retrieved Dec. 8, 2014]. Retrieved from the Internet <URL: https://web.archive.org/web/20071012230929/http://msexchange.org/articles_tutorials/exchange-server-2007/management-administration/configuring-outlook-2007-exchange-server-2007.html>.*

*Primary Examiner* — Amy M Levy
(74) *Attorney, Agent, or Firm* — Fabian VanCott

(57) ABSTRACT

Manipulating timelines includes displaying a timeline in a display and collapsing a portion of a length of the timeline such that the timeline has a time discontinuity along the length.

18 Claims, 5 Drawing Sheets

(56) References Cited

U.S. PATENT DOCUMENTS

2012/0308204 A1* 12/2012 Hwang .................. 386/241
2013/0145321 A1* 6/2013 Horiuchi .............. G06F 3/0483
   715/830
2013/0163956 A1* 6/2013 Medhurst et al. ............ 386/241
2013/0328787 A1* 12/2013 Stearns ................... G06F 3/038
   345/173
2013/0346914 A1* 12/2013 Jeong .................... G06F 3/0485
   715/784

* cited by examiner

MANIPULATING TIMELINES

BACKGROUND

A timeline is a mechanism for displaying a list of objects in chronological order. The timeline often has a graphic showing a line labeled with dates and corresponding objects along the line's length. Timelines are useful for visualizing a sequence of past or future events. The timeline generally has a scale that allows users to visual distinguish the time durations between timeline objects. Generally, the timeline has a linear scale where a unit of distance equals a set amount of time. The scale is often determined by the time duration between the timeline's objects. For example, a timeline that schematically depicts historical events for a particular century will have distance units that schematically represent a larger amount of time than a timeline of the same overall length that schematically represents events that occurred throughout a course of a day.

Timelines are also useful in project management. Such timelines may help a team understand a sequence of events and their relative timeframes to complete the project.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Timeline visualization is an efficient way to represent time based objects and lets users correlate objects visually. However, the timeline's scale is generally consistent along the timeline's length, which may lead to empty space between timeline objects. Significant empty space between timeline objects reduces the timeline's efficiency when a user can no longer see all of the timeline objects in a single view. The principles described herein provide a method for manipulating timelines by hiding portions of the timeline's length. Such a method may include displaying a timeline in a display and collapsing a portion of a length of the timeline such that the timeline has a time discontinuity along the length.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
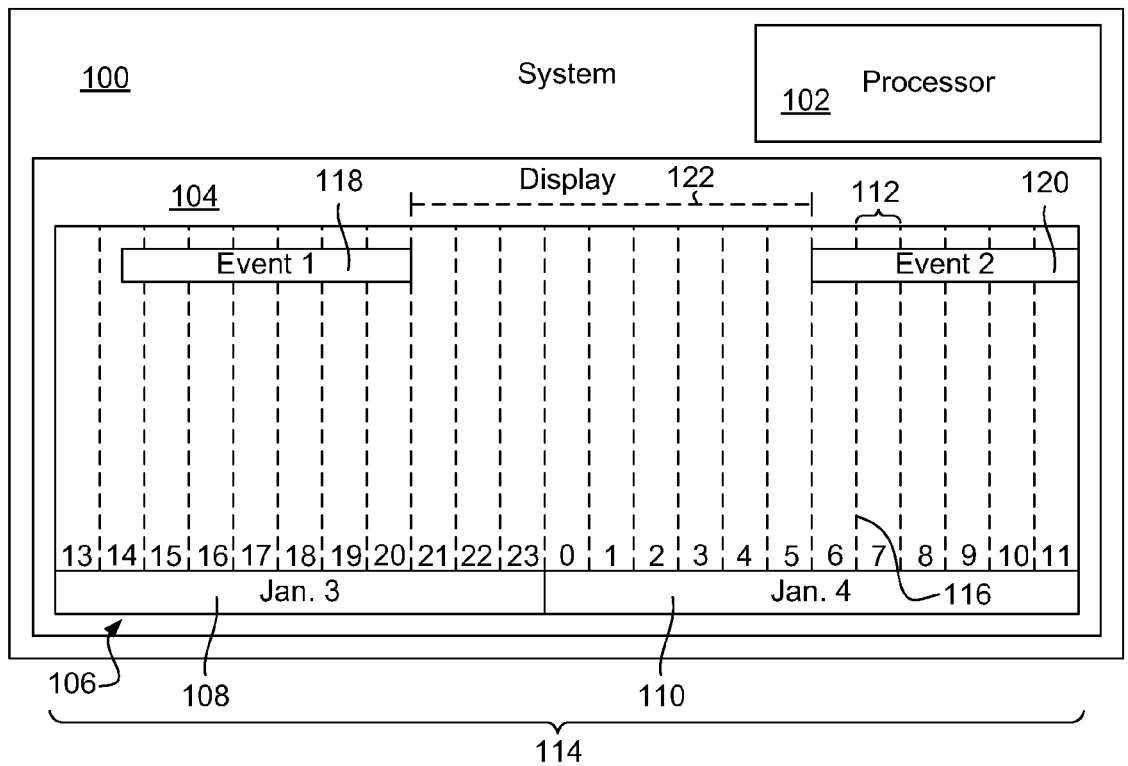
FIG. 1 is a diagram of an example of a system according to principles described herein.

FIG. 1 is a diagram of an example of a system (100) according to principles described herein. In this example, the system (100) has a processor (102) and a display (104) that displays a timeline (106). The system (100) may execute a project management program that schedules events along the timeline (106) to allow users to ascertain the project's events and their relative time durations to accomplish each event. In other examples, the timeline (106) is used for education applications, personal time management applications, scientific applications, future prediction applications, historical applications, other application, or combinations thereof.

The processor (102) may have tangible and/or non-transitory computer readable memory programmed with computer readable program code. The processor (102) may be in communication with the display (104) and may cause a timeline (106) to appear in the display.

The display (104) may be a monitor that has a visualization mechanism to cause images to be displayed. In some examples, the display (104) has multiple pixel units that light up in response to voltages applied across them. The display (104) may be an active matrix display, a passive matrix display, a plasma display, a high definition display, a touch screen display, a projected screen display, a liquid crystal display, cathode ray tube display, light emitting diode display, organic light emitting diode displays, or types of displays, or combinations thereof.

The timeline (106) in the example of FIG. 1 spans a time period that covers portions of a first day (108) and a second day (110). The timeline (106) has a scale where each distance unit (112) along a length (114) of the timeline (106) schematically represents an hour. In the illustrated example, each distance unit (112) is divided with dashed lines (116). However, in other examples, another visual divider is used. In some examples, the distance units (112) are schematically represented with a twenty four hour cycle, while in other examples, the distance units (112) are schematically represented with twelve hour cycles. In other examples, the timeline's scale has distance units (112) that schematically represent other durations of time, such at least one second, at least one minute, at least one hour, at least one fraction of a day, at least one day, at least one week, at least one month, at least one year, at least one decade, at least one century, or other time durations, or combinations thereof.

A first event object (118) is positioned along the length (114) of the timeline (106) spanning the distance units (112) that schematically represent the fourteenth hour through the twentieth hour of the first day (108). Also a second event object (120) is positioned along the length (114) of the timeline (106) spanning the distance units (112) that schematically represent the sixth hour through the eleventh hour of the second day (110).

A portion (122) of the timeline's length (114) that spans distance units (112) that schematically represent the twenty first hour of the first day (108) through the fifth hour of the second day (110) has no events. In some examples, a user may desire to collapse the portion (122) to see more of the timeline (106). In such examples, the user may visually see more of the timeline in a single view or the length (114) of the timeline (106) may shrink, which may be easier for the user to view.

In some examples, the system (100) automatically detects portions of the timeline's length (114) to collapse. In other examples, a user manually detects portions of the timeline's length (114) that the user desires to collapse regardless of the existence of timeline objects in those selected portions. In some examples, the system (100) detects portions to collapse based on a portion selection policy. The portion selection policy may include factors such as whether a timeline object exists within the selected portion, the length of the portion, the time of day of the selected portions, the proximity to timeline objects, the proximity to timeline objects designated with high importance or another status, other factors, or combinations thereof.

Figure 2:
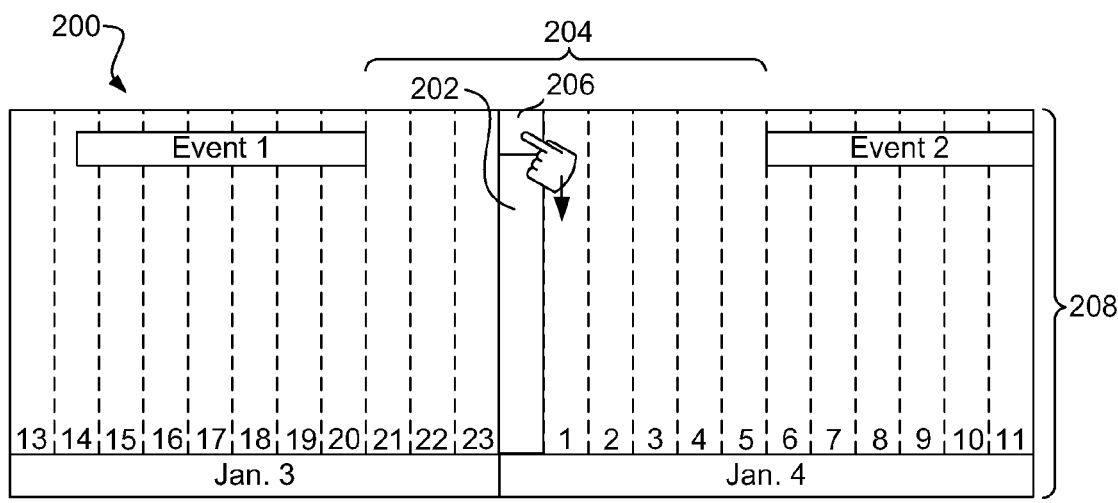
FIG. 2 is a diagram of an example of a timeline according to principles described herein.

FIG. 2 is a diagram of an example of a timeline (200) according to principles described herein. In this example, a manipulation tool (202) is created and positioned in the middle of the selected portion (204) that has no timeline objects. The manipulation tool (202) may be created in response to the system identifying the selected portion (204) or in response to user input. In other examples, the manipulation tool (202) may be created in another position of the portion (204). For example, the manipulation tool (202) may be positioned to the far left of the portion (204), far right of the portion (204), or anywhere there between in the portion (204). Yet, in other examples, the manipulation tool (202) is positioned outside of the selected portion (204). In examples where the manipulation tool (202) is formed outside of the selected portion (204), the manipulation tool (202) may be positioned to the side of the portion (204), above the portion (204), under the portion (204), proximate the portion (204), in the same display with the portion (204), another location, or combinations thereof. The manipulation tool (202) can also be inside a timeline object and cause the timeline object to shrink to a minimal size. For example, a three week holiday may be shrunk to a smaller size to ease visual correlation of the timeline objects.

In the example of FIG. 2, the manipulation tool (202) is vertically oriented. However, in other examples, the manipulation tool (202) is oriented horizontally, diagonally, oriented in another manner, or combinations thereof.

In the illustrated example, the manipulation tool (202) is a slider tool that has a slider (206) that may be slide along a height (208) of the timeline (200). As the slider (206) is moved down, the selected portion (204) may slidably collapse. Also, as the slider (206) is moved up, the selection portion (204) may be slidably restored. A specific icon 'X' on top of the tool may allow the manipulation tool (202) to be deleted and restore the original timeline area.

Figure 3:
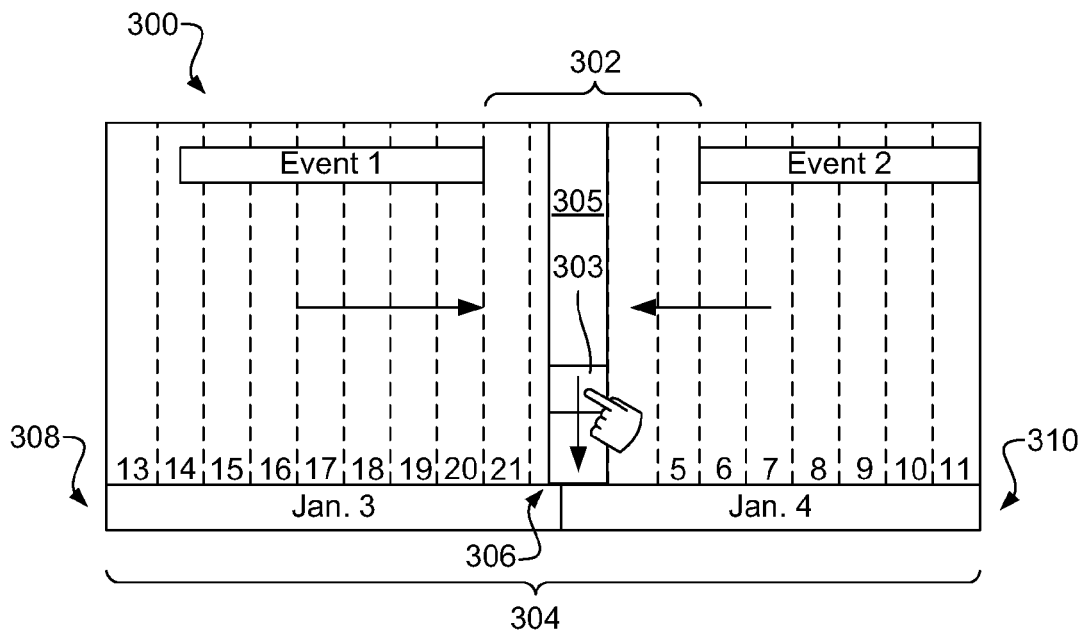
FIG. 3 is a diagram of an example of a timeline according to principles described herein.

FIG. 3 is a diagram of an example of a timeline (300) according to principles described herein. In this example, portion (302) is being collapsed as the slider (303) of the manipulation tool (305) is moved downward. As the portion (302) collapses, the length (304) of the timeline (300) may shorten. In other examples, the length (304) of the timeline (300) remains unchanged, but other portions of the timeline (300) become visual that were unseen due to the size limitations of the display. As the slider (303) is moved downward, a first time section (308) and a second time section (310) may move towards one another such that ends of the time sections (308, 310) disappear.

In the example of FIG. 3, the portion (302) may be collapsed entirely or partially. The manipulation tool (305) may provide a mechanism for collapsing the portion (302) to any desired length.

Collapsing the timeline (300) may create a time discontinuity (306) along the length (304) of the timeline (300). For example, the timeline (300) may exhibit a consistent scale on either side of the collapsed portion (302). However, at the collapsed portion, the time duration is skipped. Thus, the collapse of the portion causes the timeline to display a discontinuous time along the length (304) of the timeline (300). The time discontinuity (306) may be an instance on the timeline (300) where a first time section (308) spatially terminates and a second time section (310) spatially begins where the first and second time sections (308, 310) are temporally spaced apart from one another.

In some examples, the system is programmed to make calculations based on the information in the timeline (300). For example, the system may send a reminder to a user about an event identified in the timeline (300). The reminder may be sent several hours or days before an event. In some examples, the reminder is scheduled to be sent during the portion (302) without timeline objects. In some examples, the calculations provide a user information about how much time exists between two selected timeline objects. The system may provide the user the ability to make other calculations as well. However, even though the portion of the timeline is collapsed, the collapsed portion of the timeline is just hidden from view. The system may still continue to use the information in the collapsed view for the purposes of making calculations.

Figure 4:
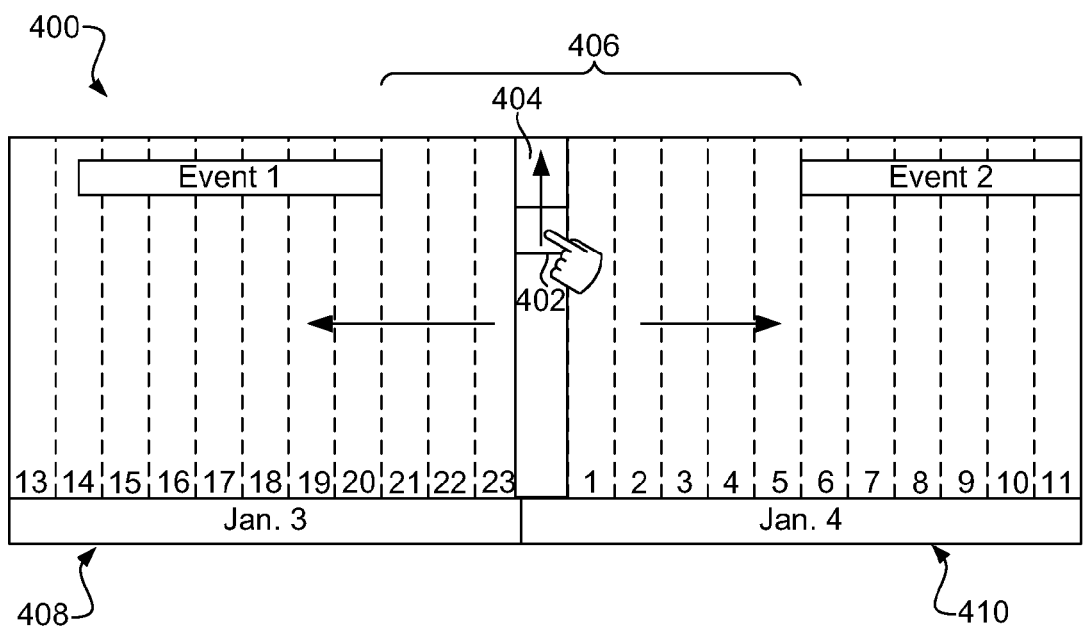
FIG. 4 is a diagram of an example of a timeline according to principles described herein.

FIG. 4 is a diagram of an example of a timeline (400) according to principles described herein. In this example, the slider (402) of the manipulation tool (404) is being slide up and the selected portion (406) is being slidably restored to its former length. As the slider (402) is moved up, the first time section (408) and the second time section (410) may move away from each other bringing into view the formerly hidden distance units of the selected portion (406).

Figure 5:
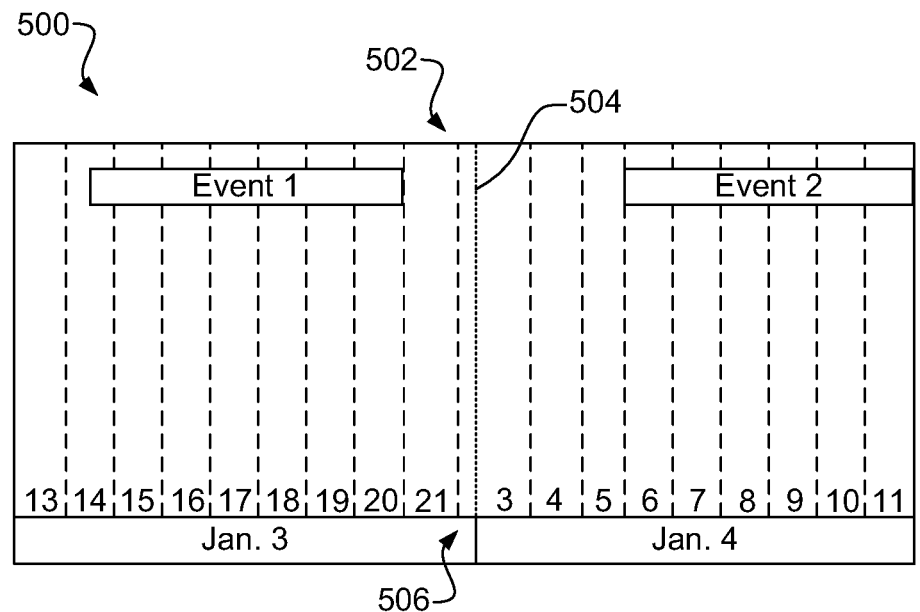
FIG. 5 is a diagram of an example of a timeline according to principles described herein.

FIG. 5 is a diagram of an example of a timeline (500) according to principles described herein. In this example, the timeline (500) has a collapsed portion marked with an identifier (502). In this example, the identifier (502) is a dashed line (504) that is positioned at the time discontinuity (506). The identifier (502) may allow a user to quickly notice where the timeline (500) has collapsed portions. In some examples, a tooltip may appear when the user focuses on the dashed line (504) that indicates how much time the dashed line (504) schematically represents. For example, the tooltip may indicate that collapsed portion indicated with the dashed line (504) schematically represents three hours and two days.

In some examples, the identifier (502) is a solid line, a flashing line, a line of color visually discernible from a background color of the timeline (500), at least one arrow, a zigzag line, a circle, a text box with a message identifying the collapsed portions, other types of identifiers, or combinations thereof. In some examples, no identifier is used. However, in such examples, the user may identify the collapsed portions by looking for time discontinuities in the timeline (500).

Figure 6:
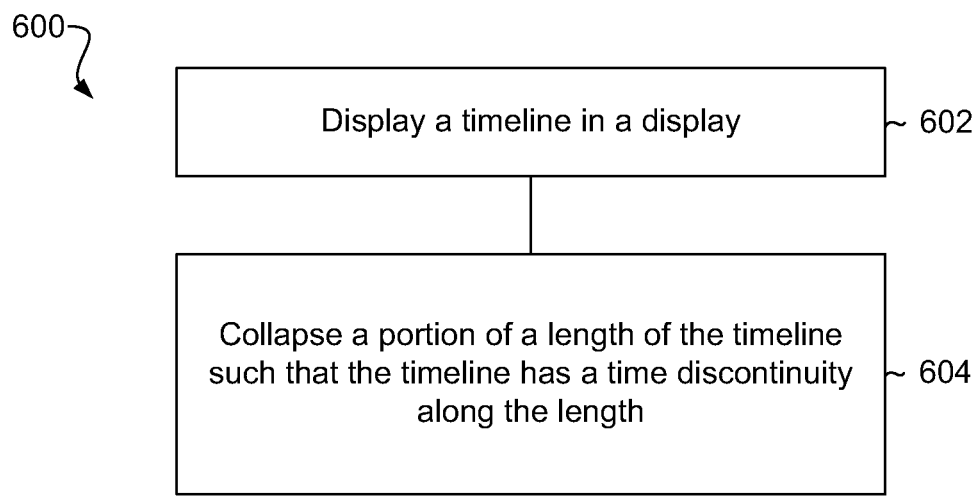
FIG. 6 is a diagram of an example of a method for manipulating a timeline according to principles described herein.

FIG. 6 is a diagram of an example of a method (600) for manipulating a timeline according to principles described herein. In this example, the method (600) includes displaying (602) a timeline in a display and collapsing a portion of a length of the timeline such that the timeline has a time discontinuity along the length.

In some examples, the method also includes restoring the portion of the length such that the time discontinuity is removed. The method may also include identifying the portions of the length based on a selection policy. In some examples, the time discontinuity is an instance on the timeline where a first time section spatially terminates and a second time section spatially begins, and the first and second time sections are temporally spaced apart from one another.

The portion may be collapsed with a manipulation tool. In some examples, the manipulation tool is a slider tool. The manipulation tool may be created in the display at the time discontinuity. Further, the manipulation tool may be vertically oriented. The portion may be slidably collapsed in response to a downward slide command made with a slider of the manipulation tool. Also, the method may include restoring at least some of the portion in response to an upward slide command made with the slider of the manipulation tool.

Figure 7:
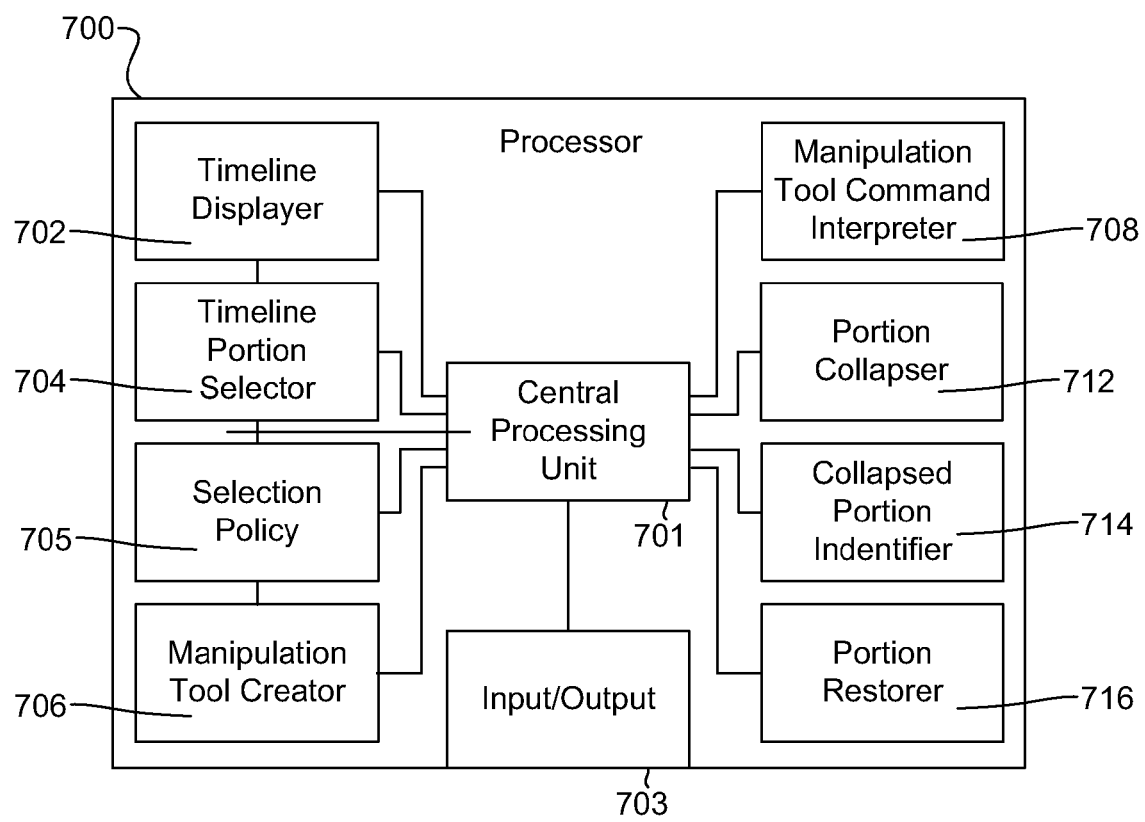
FIG. 7 is a diagram of an example of a processor according to principles described herein.

FIG. 7 is a diagram of an example of a processor (700) according to principles described herein. In this example, the processor (700) has a central processing unit (CPU) (701) that is in communication with an input/output (703). The input/output (703) may be in communication with a display, a graphics processing unit, another processor, a project manager, a calendar, a tangible or non-transistory computer readable storage medium that has computer readable program code, other devices, or combinations thereof.

In some examples, the processor (700) has a timeline displayer (702) that is programmed to display a timeline in a display. A timeline portion selector (704) may select portions of the timeline according to a selection policy (705). In some examples, the timeline portion selector (704) selects the portions in response to user input. In other examples, the timeline portion selector (704) selects the portion based on factors that include the portion's time duration, the ownership of timeline objects, the type of timeline objects, the status of timeline objects, the proximity to timeline objects, the creation date of the timeline objects, other factors, or combinations thereof.

A manipulation tool creator (706) may create a manipulation tool in response to the selection of a portion of the timeline's length. In some examples, the processor (700) automatically collapses the portions while in other examples the processor (700) collapses the portions in response to commands from the user through the manipulation tool. The processor (700) may a have manipulation command interpreter (708) that interprets user commands. In some examples, the manipulation command interpreter (708) interprets a downward movement of a slider of the manipulation tool to be a collapse command. The manipulation command interpreter (708) may also interpret how much the processor (700) should cause the portion to be collapsed. For example, the manipulation command interpreter (708) may interpret that moving the slider downward just half of the distance that the slider may move to be a command to collapse just half of the portion. Also, the manipulation command interpreter (708) may interpret an upward movement of the manipulation tool's slider to be a command to restore at least some of the portion. The processor (700) may cause the portion to be collapsed with a portion collapser (712).

In response to collapsing at least some of the portion, a collapsed portion identifier (714) may mark the location of the collapsed portion. The processor (700) may also have a portion restorer (716) that restores at least some of the portion in response to the restore command.

Figure 8:
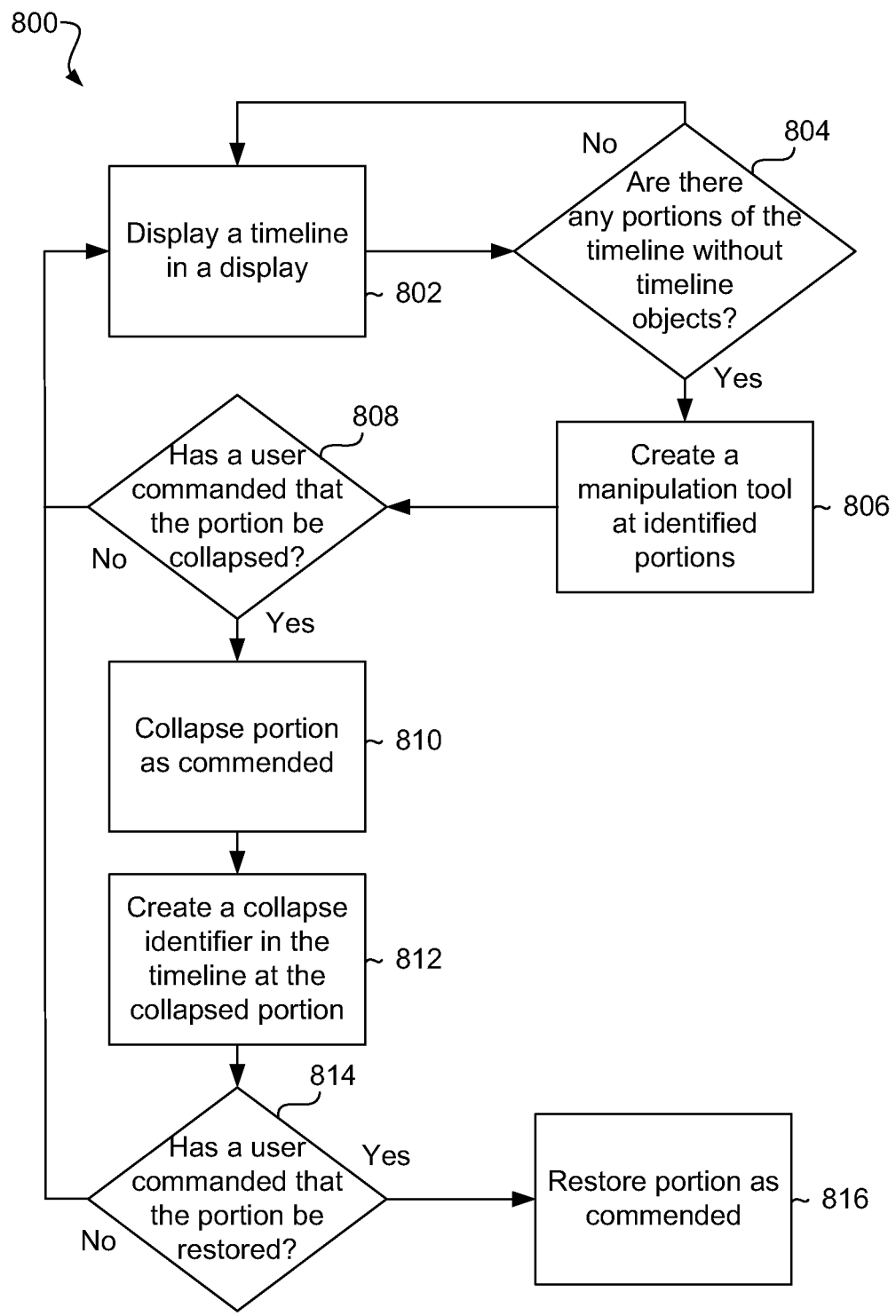
FIG. 8 is a diagram of an example of a flowchart of a process for manipulating a timeline according to principles described herein.

FIG. 8 is a diagram of an example of a flowchart (800) of a process for manipulating a timeline according to principles described herein. In this example, the process includes displaying (802) a timeline in a display and determining (804) whether there are any portions of the timeline without timeline objects. If there is no portion of the timeline without timeline objects, then the process may include continuing to display (802) the timeline.

If there are portions of the timeline that are without timeline objects, then the process may include creating (806) a manipulation tool at the identified portion. The process may further include determining (808) whether a user has commanded that the portion be collapsed. If there are no commands to collapse any of the portions, the process may include continuing to display (802) the timeline.

If a user has commanded that one of the portions be collapsed, then the process may include collapsing (810) the portion as commanded. In some examples, there are various collapsing commands because some commands may instruct the system to partially collapse the portion while other commands may instruct the system to entirely collapse the portion. The process may also include creating (812) a collapse identifier in the timeline at the collapsed portion.

The process may also include determining (814) whether a user has commanded that the portion be restored. If there has been such a command, then the process may include restoring (816) the portion as commanded. In some examples, not all restore commands are the same. For example, some restore commands may instruct the system to restore the entire collapsed portion while other restore commands may instruct the system to restore just some of the collapsed portion. If there is no command to restore any of the portions, then the process may include continuing to display (802) the timeline.

While the examples above have been described with reference to a specific manipulation tool, any manipulation tool may be used in accordance with the principles described herein. For example, the manipulation tool may be a button that triggers an entire selected portion to collapse. In response to a second activation of the button, the entire selected portion may be restored. In other examples, the manipulation tool is shaped like a wheel that causes the selected portion to be collapsed or restored depending on the direction that the wheel is rotated through user input. In some examples, the manipulation tool is responsive to voice recognition inputs, touch screen inputs, keyboard inputs, computer vision recognized gesture inputs, auditory inputs, other forms of inputs, or combinations thereof.

While the examples above have been described with reference to specific timelines that are used for managing calendaring items, any timeline or associated applications may be used in accordance with the principles described herein. Further, while the examples above have been described with specific reference to the selected portion slidably collapsing, the selected portion may collapse or be restored in any manner compatible with the principles described herein. For example, the selected portion may collapse or restore incrementally, all at once, other ways, or combinations thereof.

The selected portions may be selected in any manner that is compatible with the principles described herein. In some examples, the selected portions are selected in response to user input or are automatically collapsed by the system. In some examples, the portions of the timeline are just collapsed when the timeline is displayed in a particular mode. In some examples, a user fills in at least one field that tells the system the parameters for selecting portions. For example, the user may specify that just portions that are over a time duration threshold are to be closed. In other examples, the user has a list of options to select the parameters for selecting portions. For example, the system may give the user an option to automatically select portions that span the weekends, evenings, early mornings, timeline objects belonging to other users or teams, other options, or combinations thereof.

While the examples above have been described with reference to specific ways of selecting a portion of the timeline's length for collapsing, any mechanism may be used that is compatible with the principles described herein. In some examples, a system may automatically select portions based on a selection policy. However, in some examples, the user has an option to unselect portions that were selected automatically or that were selected through user input. In such examples, the user may recreate a portion that is better suited for the user's desires. In some examples, the user creates a larger portion to collapse, or merges two selected portions together. In some examples, the user may desire to divide the selected portion into multiple portions for individual collapse.

In some examples, collapsed portions are automatically restored if a timeline object is added to the timeline in the collapsed portion. For example, if the timeline includes timeline objects that schematically represent scheduled events, and an event is added to a portion that is collapsed, the system may automatically restore that portion. In some examples, just some of the collapsed portion with the added timeline object are restored while the remaining time duration of the collapsed portion without timeline objects may remain collapsed. In some examples, the system has a restore policy that addresses when a collapsed section is to be automatically restored. In other examples, an alert or other type of message is sent to a user or an administrator in response to an event that may cause the user to potentially want to restore at least some of the collapsed section.

In some examples, the system includes slidably or incrementally collapsing the portions from the right or from the left. In some examples, the system includes slidably or incrementally collapsing the portions from the center or other positions within the portion. Likewise, the collapsed portions may be slidably or incrementally restored from the right, left, middle, or other position within the portion. In some examples, the user selects an option that allows the user to specify how the portion is collapsed and/or restored. In some examples, the portion is collapsed from a first side and restored from a second side.

In some examples, some of the selected portions are automatically collapsed while other selected portions are not. For example, a collapse policy may include automatically collapsing timeline portions with specific workdays that have little chance of having a work event scheduled. However, the collapse policy may include keeping open timeline portions that include other workdays where there is a high probability that a work meeting will be scheduled.

In some examples, a user has an option to create group types where all portions that belong to a group will be treated by the system the same way. For example, the workdays with little probability of having a working event may be part of a first group while the workdays with a high probability of having a scheduled work event may be part of a different group. The user may specify different treatments for each group. For example, the user may specify certain selection treatments, collapse treatments, restore treatments, other treatments, or combinations thereof for each group. Each of the treatments may be based on user created policies.

The timelines may have different policies for different users. Further, in timelines where more than one timeline object occurs at the same location along the length of the timeline, the user may have a policy for collapsing certain events while not collapsing others. For example, if first and second events occur at the same time, and the user is involved in just one of the events, the user may still specify that the other event be collapsed to unclutter the timeline.

In some examples, the timeline is generated by a manager that is accessible at different locations. Each location may have a different monitor. The selection policies, collapse policies, restore policies, and other policies may be different for each type of monitor. For example, the system may determine the size of the monitor on which the timeline is displayed. When the timeline is displayed on monitors that are smaller, the policies may favor collapsing more timeline portions more when the same timeline is displayed on larger monitors because there is more room to see additional portions of the timeline in a single view.

In some examples, the system has learning functions that pay attention to a user's behavior to determine selection policies, collapse policies, restore policies, other policies, or combinations thereof. For example, the user may never collapse time durations smaller than a certain threshold. Thus, the system may notice this behavior and create a policy that does not collapse portions that are smaller than the threshold.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for manipulating timelines, comprising:
    displaying a timeline in a display, wherein said timeline has a linear scale and a unit of distance on said timeline equals a set amount of time;
    determining one or more portions of said timeline that do not include timeline objects;
    in response to a selection of a portion of a length of said timeline, creating a manipulation tool in said display in said timeline, said manipulation tool being positioned in a particular portion of the one or more portions of said timeline that do not include timeline objects, wherein the manipulation tool comprises:
        a vertical slider associated with the particular portion of said timeline that does not include timeline objects to collapse said particular portion of said length of said timeline to any desired length; and
        a deletion icon to delete said manipulation tool and restore an original timeline; and
    incrementally collapsing said portion of said length of said timeline with said manipulation tool such that said timeline comprises a time discontinuity along said length.

2. The method of claim 1, further comprising restoring said portion of said length such that said time discontinuity is removed.

3. The method of claim 1, further comprising identifying said portion of said length of said timeline based on a selection policy.

4. The method of claim 3, in which said selection policy is based on received user input identifying parameters used for selecting portions of said timeline.

5. The method of claim 1, wherein collapsing said portion of said length such that said timeline comprises said time discontinuity along said length includes slidably collapsing said portion in response to a downward slide command of a slider of said manipulation tool.

6. The method of claim 1, further comprising slidably restoring at least some of said portion in response to an upward slide command of said slider of said manipulation tool.

7. The method of claim 1, wherein said time discontinuity is an instance on said timeline where a first time section spatially terminates and a second time section spatially begins wherein said first and second time sections are temporally spaced apart from one another.

8. The method of claim 1, further comprising receiving a selection to delete said manipulation tool from said timeline.

9. The method of claim 1, further comprising restoring a collapsed portion of said timeline when a timeline object is added to said timeline in said collapsed portion.

10. The method of claim 1, further comprising restoring a collapsed portion of said timeline based on a restore policy.

11. A system for manipulating timelines, comprising:
a processor programmed to:
- display a timeline in a display, wherein said timeline has a linear scale and a unit of distance on said timeline equals a set amount of time;
- determine one or more portions of said timeline that do not include timeline objects;
- create a manipulation tool in said timeline in response to a user input, said manipulation tool being positioned in a particular portion of the one or more portions of said timeline that do not include timeline objects, wherein the manipulation tool comprises:
  - a vertical slider associated with the particular portion of said timeline that does not include timeline objects to collapse said particular portion of said timeline to any desired length; and
  - a deletion icon to delete said manipulation tool and restore an original timeline; and
- collapse a portion of said length of said timeline with said manipulation tool such that said timeline comprises a time discontinuity along said length.

12. The system of claim 11, wherein said processor is programmed to slidably collapse said portion of said length in response to a first slide command from a slider of said manipulation tool.

13. The system of claim 12, wherein said processor is further programmed to slidably restore said portion of said length in response to a second slide command from said slider of said manipulation tool.

14. The system of claim 11, wherein said processor is programmed to identify said portion of said length of said timeline based on a selection policy, in which said selection policy is based on at least one of a length of said portion, a type of timeline object in said portion, a time of day of said portion, and a proximity to other timeline objects.

15. A computer program product for manipulating timelines, comprising:
a non-transitory computer readable storage medium, said non-transitory computer readable storage medium comprising computer readable program code embodied therewith, said computer readable program code comprising:
- computer readable program code to display a timeline in a display, wherein said timeline has a linear scale and a unit of distance on said timeline equals a set amount of time;
- computer readable program code to determine one or more portions of said timeline that do not include timeline objects;
- computer readable program code to create a manipulation tool in said timeline in response to a user input, said manipulation tool being positioned in a particular portion of said one or more portions of said timeline that do not include timeline objects, wherein the manipulation tool comprises:
  - a vertical slider associated with the particular portion of said timeline that does not include timeline objects to collapse said particular portion to any desired length; and
  - a deletion icon to delete said manipulation tool and restore an original timeline; and
- computer readable program code to collapse a portion of a length of said timeline with said manipulation tool such that said timeline comprises a time discontinuity along said length.

16. The computer program product of claim 15, wherein said manipulation tool is arranged vertically in said display and located at said time discontinuity of said timeline.

17. The computer program product of claim 15, further comprising computer readable program code to identify said portion of said length of said timeline based on a selection policy, in which said selection policy is based on a size of a monitor on which said timeline is displayed.

18. The computer program product of claim 15, further comprising computer readable program code to identify said portion of said length of said timeline based on a selection policy, in which said selection policy is based on learned user behavior.

* * * * *